United States Patent [19]
Hillis

[11] Patent Number: 5,485,627
[45] Date of Patent: Jan. 16, 1996

[54] PARTITIONABLE MASSIVELY PARALLEL PROCESSING SYSTEM

[75] Inventor: W. Daniel Hillis, Cambridge, Mass.

[73] Assignee: Thinking Machines Corporation, Cambridge, Mass.

[21] Appl. No.: 997,992

[22] Filed: Dec. 28, 1992

Related U.S. Application Data

[62] Division of Ser. No. 725,395, Jul. 1, 1991, Pat. No. 5,175,865, which is a continuation of Ser. No. 380,757, Jul. 17, 1989, abandoned, which is a continuation of Ser. No. 924,090, Oct. 28, 1986, abandoned.

[51] Int. Cl.⁶ .................................................. G06F 15/16
[52] U.S. Cl. .................. 395/800; 395/311; 364/DIG. 1; 364/228.7; 364/228.9; 364/229; 364/229.1; 364/229.4; 364/229.5
[58] Field of Search .................................... 395/800, 325, 395/200; 364/131–133

[56] References Cited

U.S. PATENT DOCUMENTS

| | | | |
|---|---|---|---|
| 3,916,380 | 10/1975 | Fletcher et al. | 364/200 |
| 4,047,892 | 1/1981 | Lawrence | 364/200 |
| 4,051,551 | 9/1977 | Lawrie et al. | 364/200 |
| 4,065,808 | 12/1977 | Schomberg et al. | 364/200 |
| 4,380,046 | 4/1983 | Fung | 364/200 |
| 4,466,060 | 8/1984 | Riddle | 364/200 |
| 4,494,185 | 1/1985 | Gunderson et al. | 364/200 |
| 4,498,134 | 2/1985 | Hansen et al. | 364/200 |
| 4,523,273 | 6/1985 | Adams, III et al. | 364/200 |
| 4,598,400 | 7/1986 | Hillis | 370/64 |
| 4,622,632 | 11/1986 | Tanimoto et al. | 364/200 |
| 4,709,327 | 11/1987 | Hillis et al. | 364/200 |
| 4,805,091 | 2/1989 | Thiel et al. | 364/200 |
| 4,814,973 | 3/1989 | Hillis | 364/200 |
| 5,115,865 | 12/1992 | Hillis | 395/800 |
| 5,129,077 | 7/1992 | Hillis | 395/500 |

OTHER PUBLICATIONS

Hayes et al., "A Microprocessor–based Hypercube Supercomputer," *IEEE Micro,* 1986, vol. 6 No. 5, pp. 6–17.

Asbury et al., "Concurrent Computers Ideal For Inherently Parallel Problems," *Computer Design,* Sep. 1985, pp. 99–107.

Adams et al., "Modeling Algorithm Execution Time on Processor Arrays," *Computer,* Jul. 1984, pp. 38–43.

Neches, P., "The Anatomy of a Data Base Computer System," *IEEE Computer Conference,* Feb. 1985, pp. 252–254.

Seitz, C. L., "The Cosmic Cube," *Communications of the ACM* vol. 28 No. 1, Jan. 1985, pp. 22–33.

Barnes, G., et al., "The Illiac IV Computer," *IEEE Transactions on Computers,* vol. C–17 No. 8, Aug. 1968, pp. 746–757.

Hwang, K., et al., "Resource Optimization of a Parallel Computer for Multiple Vector Processing," *IEEE Transactions on Computers,* vol. C–29 No. 9, Sep. 1980, pp. 831–836.

*Primary Examiner*—Paul V. Kulik
*Attorney, Agent, or Firm*—Richard A. Jordan

[57] ABSTRACT

Apparatus is described for allocating the resources of a parallel computer. The computer is divided into a plurality of processor arrays, a plurality of host computers are provided, and the host computers and the arrays are interfaced by an interconnection means that can connect any host computer to any one or more of the arrays. A specific connection means comprises a plurality of first multiplexers, one for each array, for writing data from any host computer to any array; a plurality of second multiplexers, one for each host computer, for reading from any array to any host computer; and control means for controlling the multiplexers so as to connect the host computers and arrays as desired by the users. The control means comprises a status register which specifies the connections between the host computers and the processor arrays as specified by the users.

7 Claims, 9 Drawing Sheets

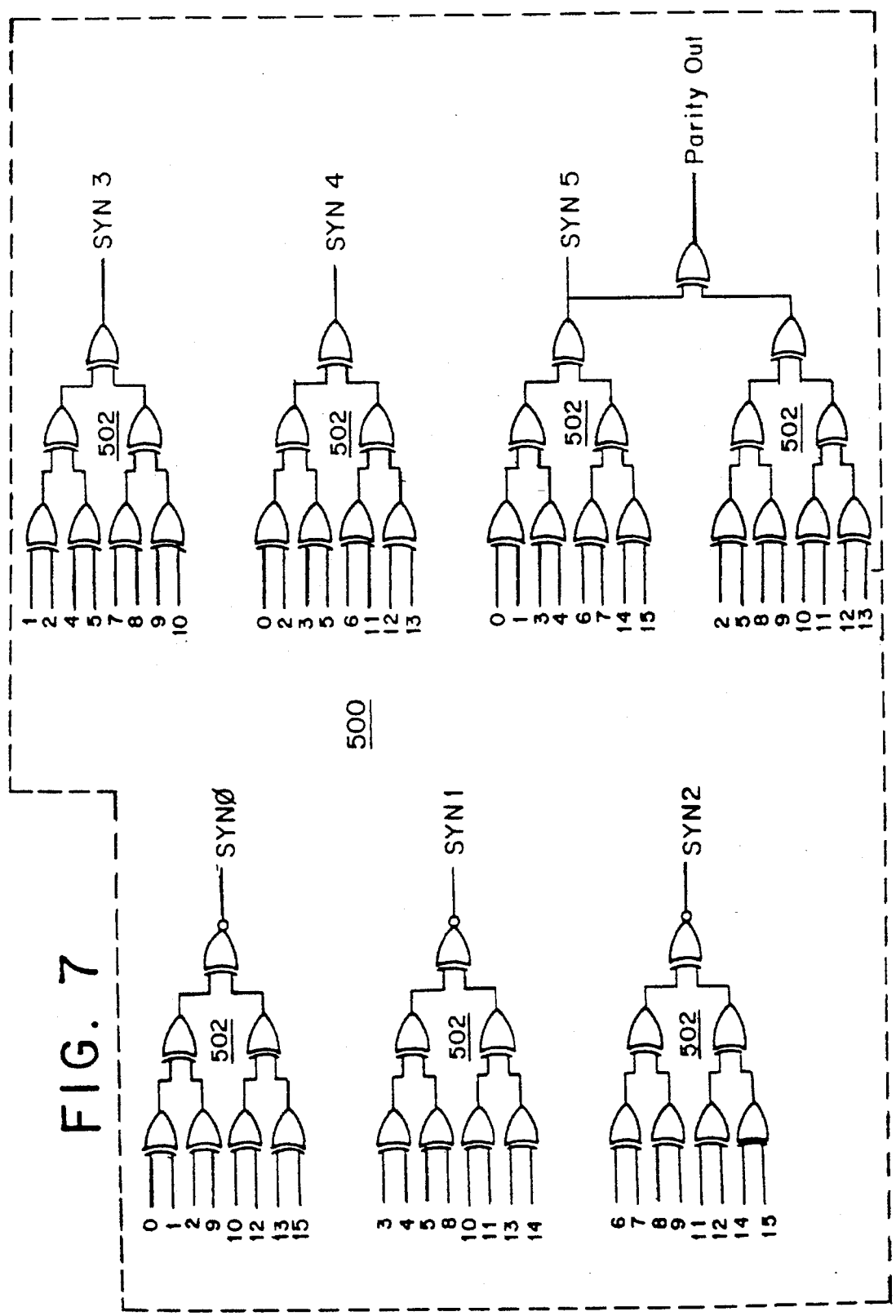

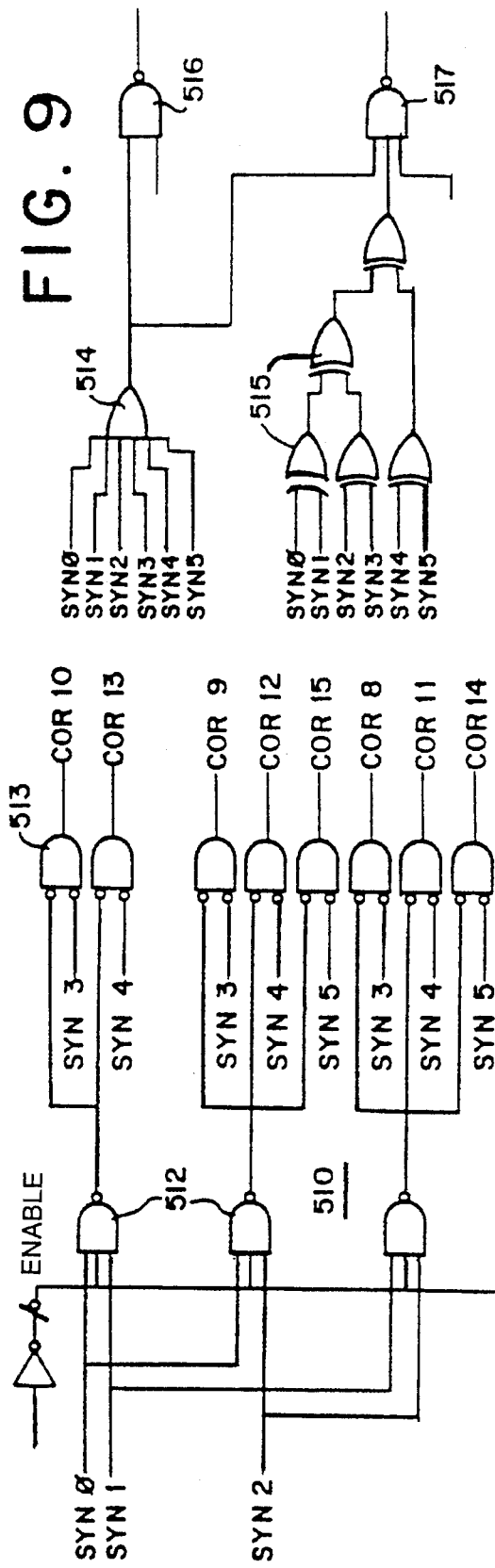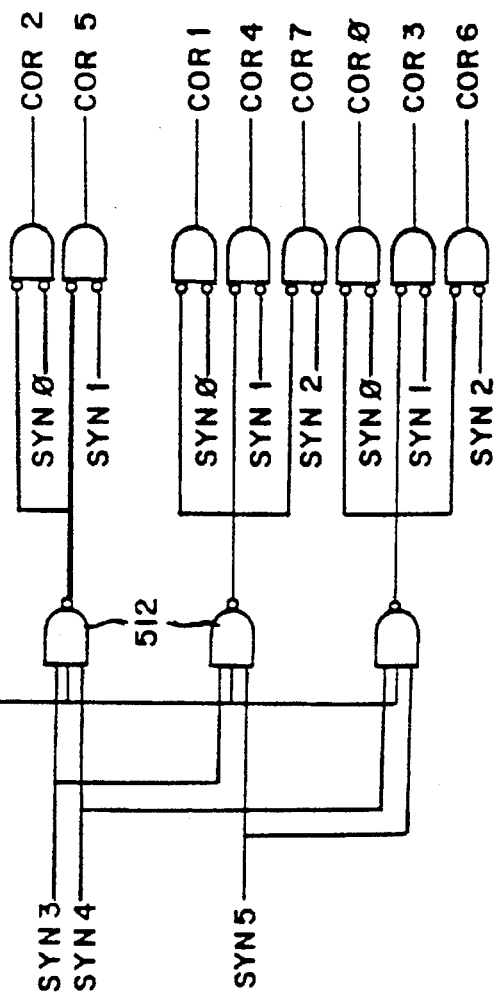
FIG. 9
FIG. 8

PARTITIONABLE MASSIVELY PARALLEL PROCESSING SYSTEM

This application is a divisional of U.S. patent application Ser. No. 07/725,395, filed Jul. 1, 1991, which is a continuation of U.S. patent application Ser. No 07/380,757, filed Jul. 17, 1989, now abandoned, which is a continuation of U.S. patent application Ser. No. 06/924,090, filed Oct. 28, 1986, now abandoned.

CROSS REFERENCE TO RELATED APPLICATIONS

Related applications are "Parallel Processor", Ser. No. 499,474, now U.S. Pat. No. 4,814,973, and "Parallel Processor/Memory Circuit", Ser. No. 499,471, now U.S. Pat. No. 4,709,372, both filed May 31, 1983, "Method and Apparatus for Routing Message Packets", Ser. No 671,835, filed Nov. 15, 1984, now U.S. Pat. No. 4,598,400, "Method and Apparatus for Interconnecting Processors in a Hyper-Dimensional Array", Ser. No 740,943, filed May 31, 1985, now U.S. Pat. No. 4,805,091, and "Very Large Scale Computer", Ser. No. 902,290, filed Aug. 29, 1986, now U.S. Pat. No. 5,129,077, issued Jul. 7, 1992 all of which are incorporated herein by reference.

BACKGROUND OF THE INVENTION

This relates to massively parallel processors and, in particular, to improvements in the methods and apparatus first disclosed in the above-referenced '471 and '474 applications and U.S. Pat. No. 4,598,400.

As shown in FIG. 1A of the '400 patent which is reproduced in FIG. 1, the computer system of those applications comprises a mainframe computer 10, a microcontroller 20, an array 30 of parallel processing integrated circuits 35, a data source 40, a first buffer and multiplexer/demultiplexer 50, first, second, third and fourth bidirectional bus control circuits 60, 65, 70, 75, a second buffer and multiplexer/demultiplexer 80, and a data sink 90. Mainframe computer 10 may be a suitably programmed commercially available general purpose computer such as a VAX (TM) computer manufactured by Digital Equipment Corp. Microcontroller 20 is an instruction sequencer of conventional design for generating a sequence of instructions that are applied to array 30 by means of a thirty-two bit parallel bus 22. Microcontroller 20 receives from array 30 a signal on line 26. This signal is a general purpose or GLOBAL signal that can be used for data output and status information. Bus 22 and line 26 are connected in parallel to each IC 35. As a result, signals from microcontroller 20 are applied simultaneously to each IC 35 in array 30 and the signal applied to microcontroller 20 on line 26 is formed by combining the signal outputs from all of ICs 35 of the array.

Array 30 contains thousands of identical ICs 35; and each IC 35 contains several identical processor/memories 36. In the embodiment disclosed in the '400 patent, it is indicated that the array may contain up to 32,768 ($=2^{15}$) identical ICs 35; and each IC 35 may contain 32 ($=2^5$) identical processor/memories 36. At the time of filing of this application for patent, arrays containing up to 4096 ($=2^{12}$) identical ICs 35 containing 16 ($=2^4$) identical processor/memories each have been manufactured and shipped by the assignee as Connection Machine (TM) computers.

Processor/memories 36 are organized and interconnected in two geometries. One geometry is a conventional two-dimensional grid pattern in which the processor/memories are organized in a rectangular array and connected to their four nearest neighbors in the array. For convenience, the sides of this array are identified as NORTH, EAST, SOUTH and WEST. To connect each processor/memory to its four nearest neighbors, the individual processor/memories are connected by electrical conductors between adjacent processor/memories in each row and each column of the grid.

The second geometry is that of a Boolean n-cube of fifteen dimensions. To understand the n-cube connection pattern, it is helpful to number the ICs from 0 to 32,767 and to express these numbers or addresses in binary notation using fifteen binary digits. Just as we can specify the position of an object in a two dimensional grid by using two numbers, one of which specifies its position in the first dimension of the two-dimensional grid and the other which specifies it position in the second dimension, so too we can use a number to identify the position of an IC in each of the fifteen dimensions of the Boolean 15-cube. In an n-cube, however, an IC can have one of only two different positions, 0 and 1, in each dimension. Thus, the fifteen-digit IC address in binary notation can be and is used to specify the IC's position in the fifteen dimensions of the n-cube. Moreover, because a binary digit can have only two values, zero or one, and because each IC is identified uniquely by fifteen binary digits, each IC has fifteen other ICs whose binary address differs by only one digit from its own address. We will refer to these fifteen ICs whose binary address differs by only one from that of a first IC as the first IC's nearest neighbors. Those familiar with the mathematical definition of a Hamming distance will recognize that the first IC is separated from each of its fifteen nearest neighbors by the Hamming distance one.

To connect ICs 35 of the above-referenced applications in the form of a Boolean 15-cube, each IC is connected to its fifteen nearest neighbors by 15 input lines 38 and fifteen output lines 39. Each of these fifteen input lines 38 to each IC 35 is associated with a different one of the fifteen dimensions of the Boolean 15-cube and likewise each of the fifteen output lines 39 from each IC 35 is associated with a different dimension. Specific details of the connection wiring for the Boolean n-cube are set forth in U.S. Pat. No. 4,805,091 referenced above. To permit communication through the interconnection pattern of the Boolean 15-cube, the results of computations are organized in the form of message packets; and these packets are routed from one IC to the next by routing circuitry in each IC in accordance with address information that is part of the packet.

An illustrative processor/memory 36 is disclosed in greater detail in FIG. 2 which is the same as FIG. 7A of the '400 patent. As shown in FIG. 2, the processor/memory comprises 32×12 bit random access memory (RAM) 250, arithmetic logic unit (ALU) 280 and flag controller 290. The ALU operates on data from three sources, two registers in the RAM and one flag input, and produces two outputs, a sum output that is written into one of the RAM registers and a carry output that is made available to certain registers in the flag controller as well as to certain other processor/memories.

The inputs to RAM 250 are address busses 152, 154, 156, 158, a sum output line 285 from ALU 270, the message packet input line 122 from communication interface unit (CIU) 180 of FIG. 6B of U.S. Pat. No. 4,814,973 and a WRITE ENABLE line 298 from flag controller 290. The outputs from RAM 250 are lines 256, 257. The signals on lines 256, 257 are obtained from the same column of two different registers in RAM 250, one of which is designed Register A and the other Register B. Busses 152, 154, 156, 158 address these registers and the columns therein in accordance with the instruction words from microcontroller 20.

Flag controller 290 is an array of eight one-bit D-type flip-flops 292, a two-out-of-sixteen selector 294 and some logic gates. The inputs to flip-flops 292 are a carry output signal from ALU 280, a WRITE ENABLE signal on line 298 from selector 294, and the eight lines of bus 172 from programmable logic array (PLA) 150 of FIG. 6B of the '474 application. Lines 172 are address lines each of which is connected to a different one of flip-flops 292 to select the one flip-flop into which a flag bit is to be written. The outputs of flip-flops 292 are applied to selector 294.

The inputs to selector 294 are up to sixteen flag signal lines 295, eight of which are from flip-flops 292, and the sixteen lines each of busses 174, 176. Again, lines 174 and 176 are address lines which select one of the flag signal lines for output or further processing. Selector 294 provides outputs on lines 296 and 297 that are whichever flags have been selected by address lines 174 and 176, respectively. The flags are defined in detail in Table IV of the '400 patent.

ALU 280 comprises a one-out-of-eight decoder 282, a sum output selector 284 and a carry output selector 286. As detailed in the '474 application, this enables it to produce sum and carry outputs for many functions including ADD, logical OR and logical AND. ALU 280 operates on three bits at a time, two on lines 256, 257 from Registers A and B in RAM 250 and one on line 296 from flag controller 290. The ALU has two outputs: a sum on line 285 that is written into Register A of RAM 250 and a carry on line 287 that may be written into a flag register 292 and applied to the North, East, South, West and DAISY inputs of the other processor/memories 36 to which this processor/memory is connected.

Each integrated circuit 35 also includes certain supervisory circuitry for the processor/memories on the IC and a routing circuit 200 for connecting the IC to its nearest neighbor ICs in the Boolean n-cube. As disclosed in the '400 patent, the supervisory circuitry comprises a timing generator 140, a programmable logic array 150 for decoding instructions received from microcontroller 20 and providing decoded instructions to the processor/memories of the IC, and a communications interface 180 which controls the flow of outgoing and incoming message packets between the processor/memories of an IC and the routing circuit associated with that IC.

Routing circuit 200 controls the routing of message packets to and from nearest neighbor ICs in the Boolean n-cube. As shown in FIG. 6B of the '400 patent, circuit 200 comprises a line assigner 205, a message detector 210, a buffer and address restorer 215 and a message injector 220. Line assigner 205 has fifteen input lines 38 from the fifteen nearest neighbors of that particular IC and fifteen output lines 39 to the same fifteen nearest neighbors. Line assigner 205 also has fifteen message output lines 206 to message detector 210 and fifteen message input lines 207 from message injector 220. Line assigner 205 analyzes the addresses of message packets received on incoming lines 38 to determine whether they are directed to this particular IC or some other IC; it routes the message packets toward their destination if possible; and it stores any message packet destined for this IC as well as any message packet that cannot be routed on because of a conflict in circuit allocation.

Message detector 210 checks for the receipt of message packets, examines the address of the message packets received on lines 207 from line assigner 205 and supplies those message packets addressed to this IC to communications interface 180. Buffer and address restorer 215 comprise a tapped shift register. The output of the buffer and address restorer is applied to the message injector 220. Message injector 220 injects a single message packet at a time from communications interface 180 into the group of message packets circulating through the routing circuit.

SUMMARY OF THE INVENTION

The use of thousands of identical processor/memories operating in parallel opens up whole new vistas of computation. Problems which could not be attempted because of the limitations of serial computers now can be executed in reasonable time using a parallel computer such as the Connection Machine Computer.

This vast increase in computing power is not needed for every problem that can advantageously be addressed by a parallel computer. Some problems simply do not have sufficient data to take up all the resources of a large parallel computer; and others do not make severe demands on the computational powers of a parallel computer.

The present invention is directed to a method and apparatus for allocating the resources of a parallel computer. In accordance with the invention, it permits a user to easily adjust the size of a parallel computer to meet the requirements of the database and program that are run on the computer. Further, the invention provides a convenient means of connecting additional users to the parallel computer so as to utilize computing resources that are not already assigned to other users.

This is accomplished by dividing the parallel computer into a plurality of processor arrays, by providing a plurality of host computers, and by interfacing the host computers and the arrays by an interconnection means that can connect any host computer to any one or more of the arrays.

A specific connection means comprises a plurality of first multiplexers, one for each array, for writing data from any host computer to any array; a plurality of second multiplexers, one for each host computer, for reading data from any array to any host computer; and control means for controlling the multiplexers so as to connect the host computers and arrays as desired by the users. The control means comprises a status register which stores the connections between the host computers and the processor arrays as specified by the users.

Illustratively for the case of a system using four host computers and four processor arrays, each first multiplexer has four inputs, one from each of the four host computers; and each second multiplexer has four inputs, one from each processor array. To select any one of these four inputs as the output from the multiplexer, the control means generates from the signals stored in the status register an encoded two-bit selection signal that is applied to the multiplexer along with a no-operation signal if no such connection is to be made.

BRIEF DESCRIPTION OF DRAWINGS

These and other objects, features and advantages of the invention will be more readily apparent from the following description of a preferred embodiment of the invention in which:

FIG. 7 is a schematic diagram illustrating further details of an element of FIG. 6; and FIGS. 8 and 9 are schematic diagrams illustrating further details of a second element of FIG. 6.

DETAILED DESCRIPTION OF PREFERRED EMBODIMENT

Figure 1:
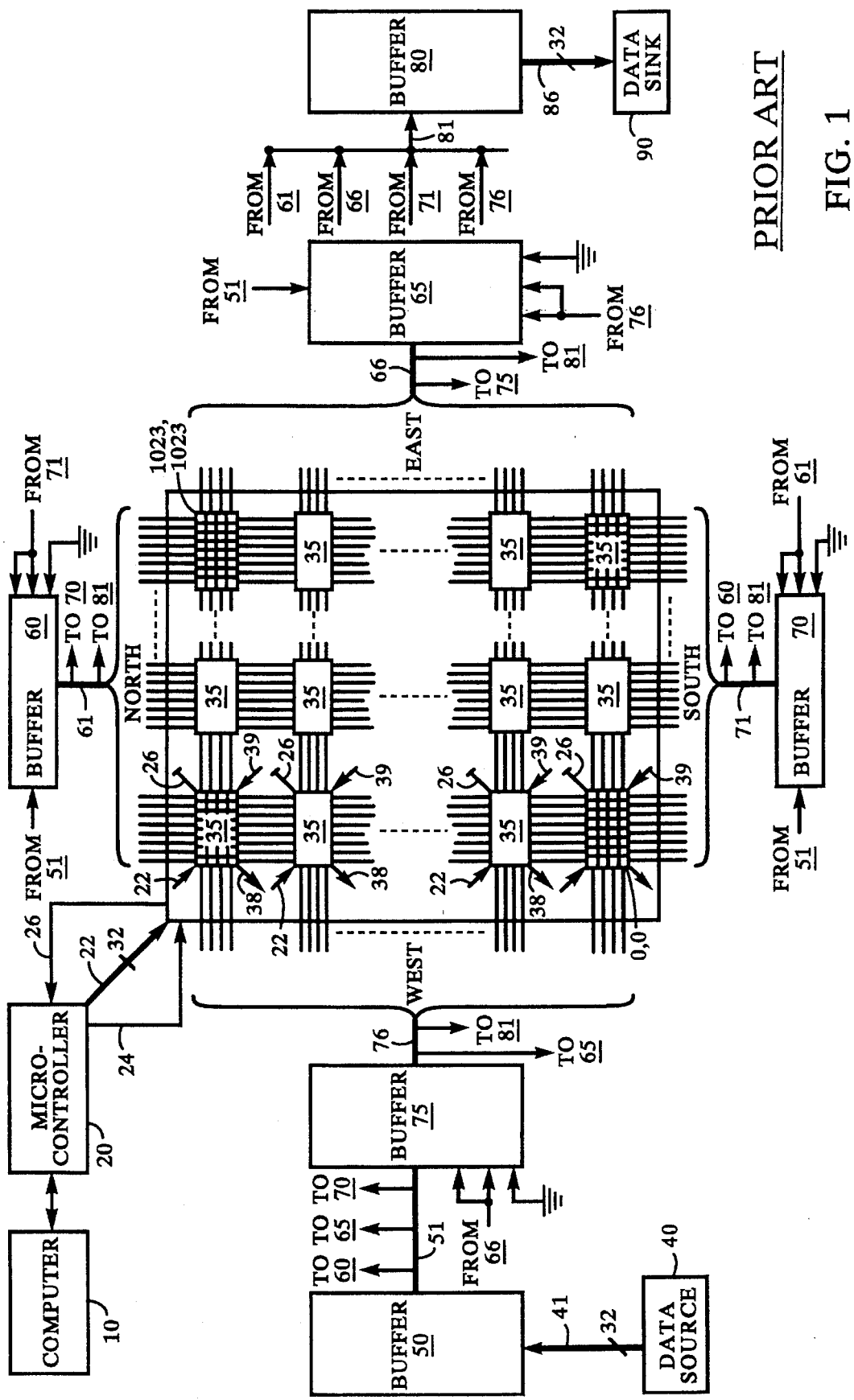
FIG. 1 is a schematic diagram of a parallel processor of the prior art.
Figure 2:
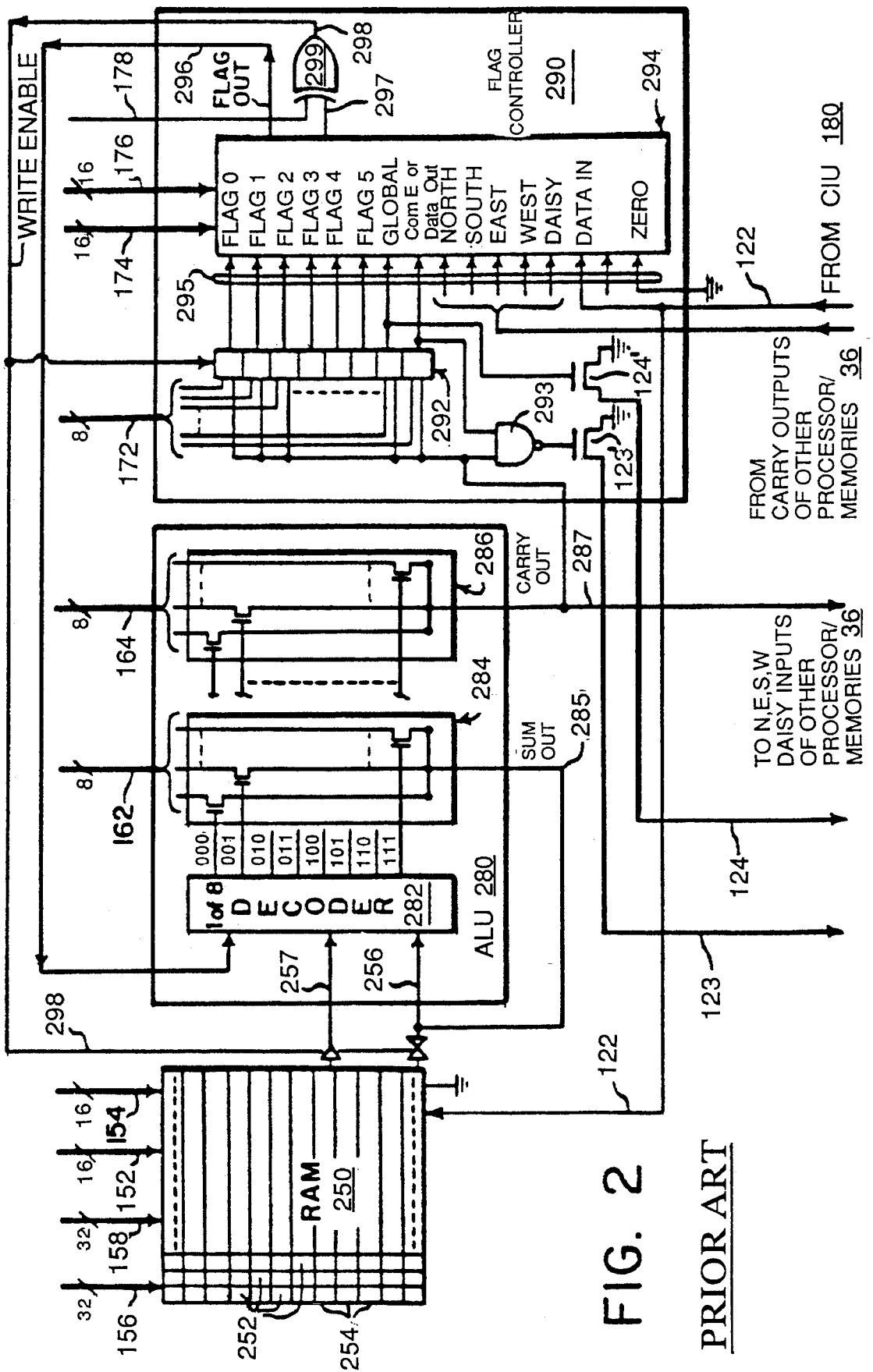
FIG. 2 is a schematic diagram of a processor/memory of the parallel processor of FIG. 1.
Figure 3:
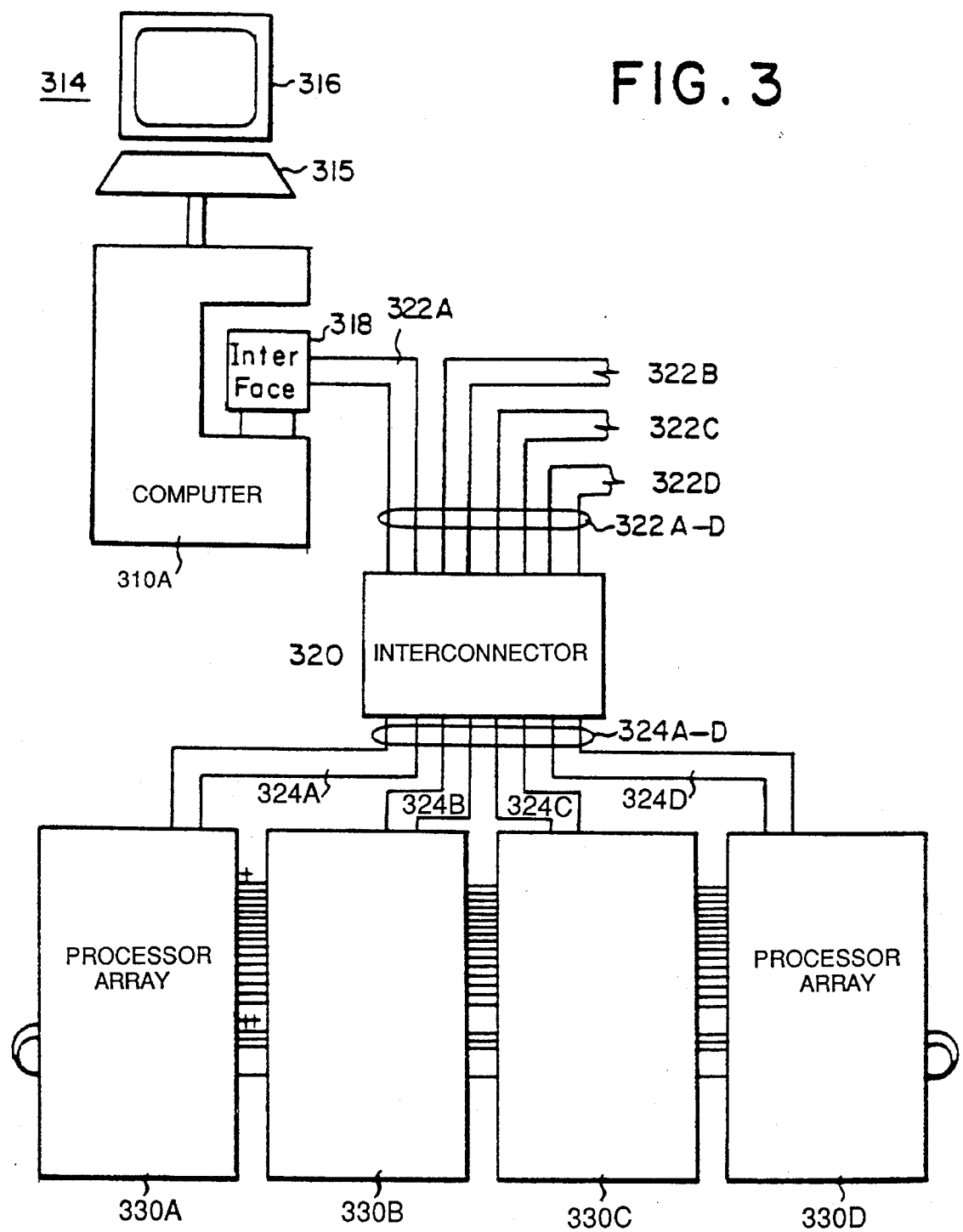
FIG. 3 is a general schematic diagram of a preferred embodiment of the invention.

As shown in FIG. 3, the preferred embodiment of the present invention comprises a plurality of host computers 310A–D, an interconnector 320, first and second bidirectional busses 322A–D, 324A–D to the interconnector, and a plurality of processor arrays 330A–D. Illustratively, each host computer is a VAX (TM) computer 312 in which the LISP programming language is implemented. The host computer illustratively also includes a console 314 having a keyboard 315 and a CRT display 316, some form of hardcopy output such as a printer (not shown) and an interface 318 between the computer and the input bus to interconnector 320.

Interconnector 320 permits any one of the host computers to be connected to any one or more of arrays 330A–D, thereby permitting the system to be reconfigured to meet the needs of each user at the different consoles. For example, each console could be connected by interconnector 320 to one of processor arrays 330A–D. Alternatively, any single console could be connected by interconnector 320 to any one, two, three or all four processor arrays 330A–D. Further details of interconnector 320 are set forth in FIG. 5.

Each processor array 330A–D illustratively comprises 16,384 (=$2^{14}$) processors. The 65,536 (=$2^{16}$) processors of the four arrays shown in FIG. 3 are connected in two geometries. One is a conventional rectangular two-dimensional array in which each processor is connected to its nearest neighbor to the north, east, west and south (NEWS). The other is a twelve-dimensional hypercube in which groups of sixteen processors are connected along each of the twelve edges of the hypercube to the twelve adjacent groups of sixteen processors as described in more detail below.

Figure 4:
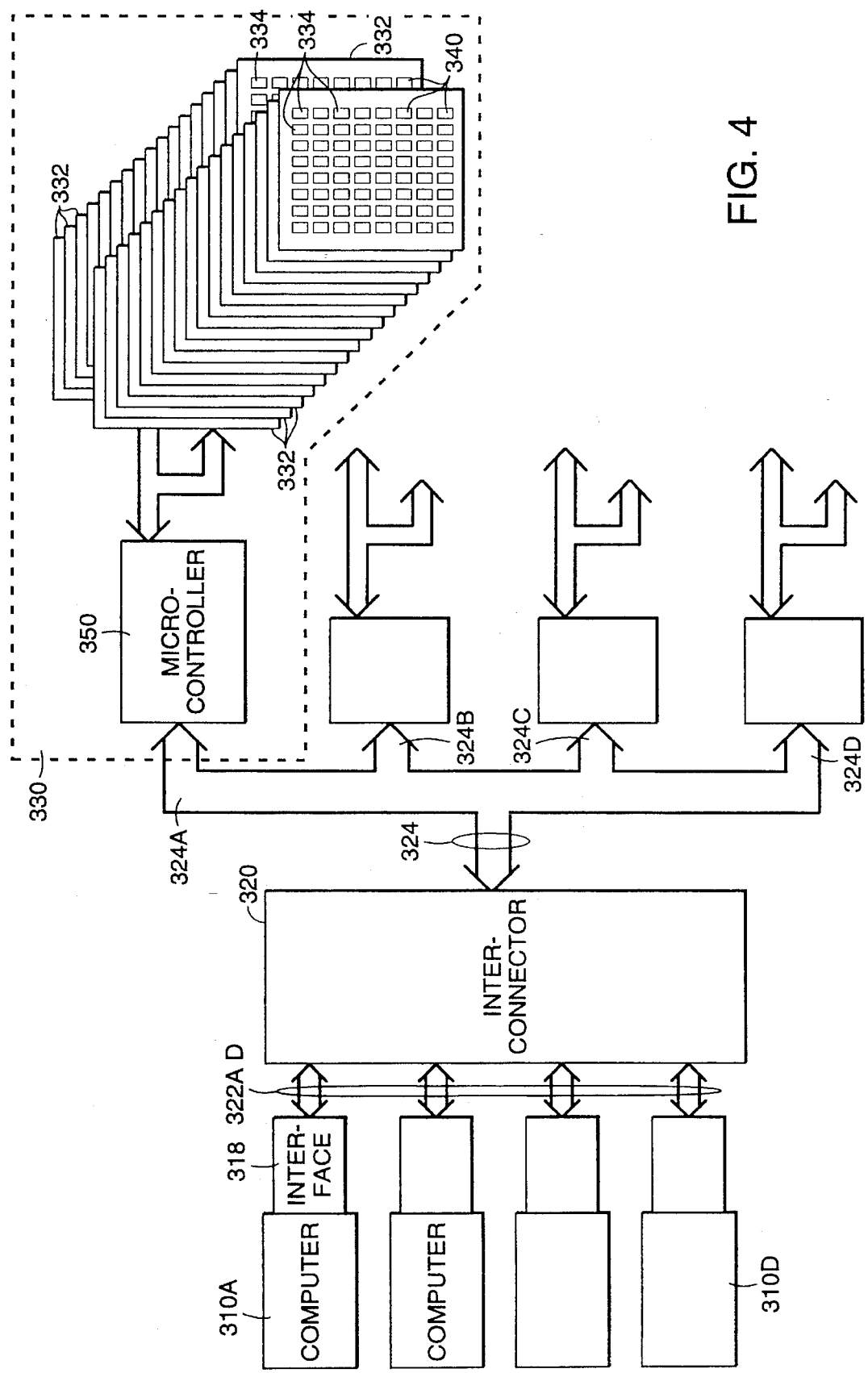
FIG. 4 is a more detailed schematic diagram of the embodiment of FIG. 3.
Figure 4A:
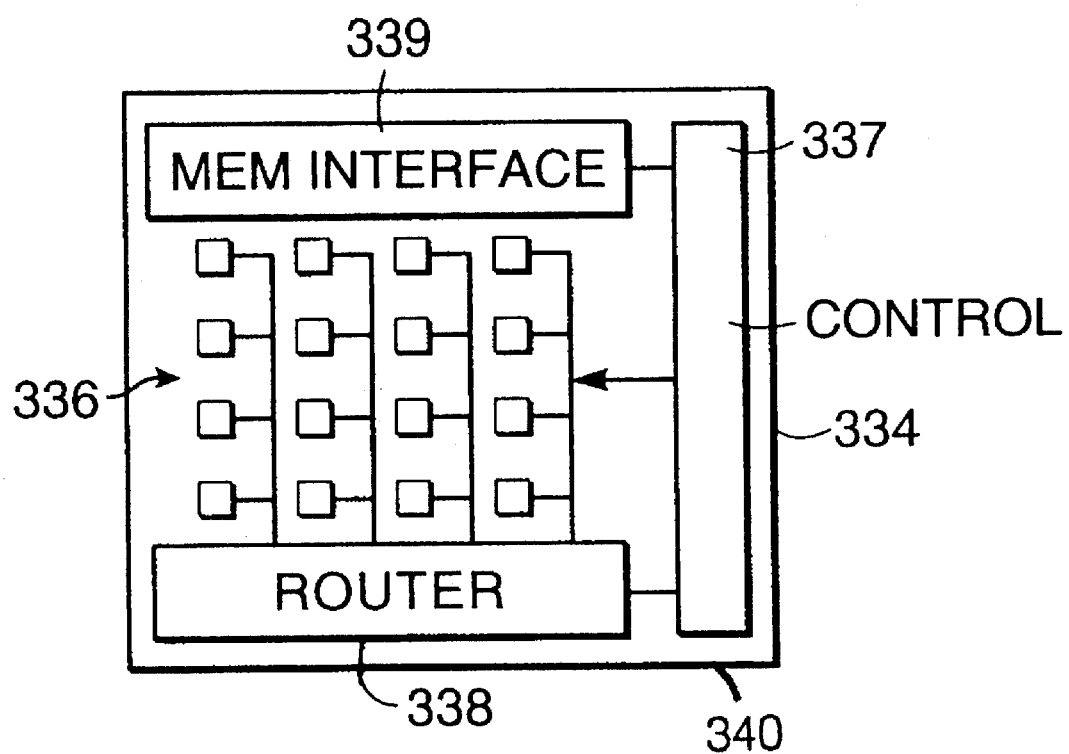
FIG. 4A is a more detailed schematic diagram of an element of FIG. 4.
Figure 6:
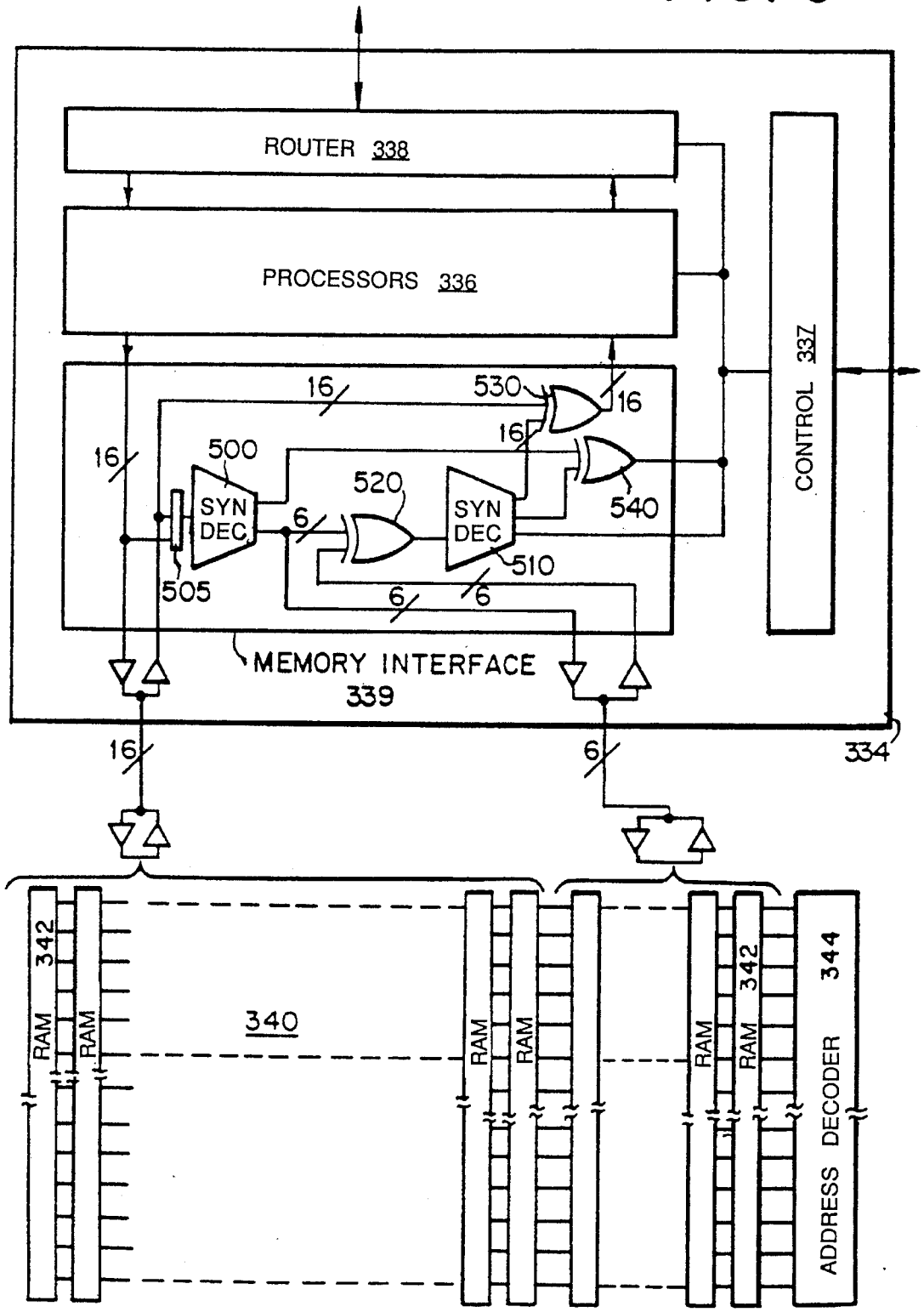
FIG. 6 is a schematic diagram illustrating an error-correction circuit for use in the system of FIG. 3.

AS shown in FIG. 4, the processors of an array 330 are mounted on thirty-two circuit boards 332. Each circuit board 332 mounts thirty-two integrated circuits 334, in a 4×8 array, each circuit containing sixteen identical processors 336, a control unit 337, a router 338, and a memory interface 339. Each circuit board also mounts 4K bits of random access memory (RAM) 340 for each processor 336 on the board. Illustratively, as shown in FIG. 6, this memory is provided in the form of twenty-two 4K×1 bit RAM integrated circuits 342 associated with each integrated circuit 334. In each such memory each of sixteen 4K×1 bit slices functions as the memory for a different one of the sixteen identical processors 336 as set forth in more detail below. The remaining six 4K×1 bit slices store parity or syndrome bits calculated as detailed below for the data stored in the memories of the sixteen identical processors. Integrated circuits 342 are addressed in parallel by address decoder 344 so that parallel data is read from or written to each integrated circuit at the address specified by the address decoder. In practice a single address decoder can be used to control parallel addressing of all the RAM integrated circuits 342 on a single circuit board 332, or in an entire array 330, or even in all the arrays.

Each processor array also comprises a microcontroller 350A–D shown in FIG. 4 which is connected to interconnector 320 by one of the busses of the second bus array, and extensive interconnection circuitry 360 between each processor and its memory, between each processor and its four nearest neighbors in the processor array and between each router 338 and its nearest router neighbors in a ten-dimensional hypercube in the processor array as well as two other routers in two other processor arrays 330.

Following the teaching of the above-referenced U.S. Pat. No. 4,805,091, each router is connected in the hypercube to five nearest neighbor routers mounted with it on the same circuit board and to five nearest neighbor routers mounted on five other circuit boards of the same processor array. For each router, the connections to the five routers on the same circuit board are connections in the same five dimensions, illustratively dimensions 1–5 of the hypercube; the connections to the routers on the five other circuit boards are connections in another five dimensions, illustratively dimensions 6–10 of the hypercube; and the connections to routers in other arrays are connections in the remaining two dimensions, illustratively dimensions 11 and 12.

Integrated circuit 334 contains about 50,000 active devices and illustratively is implemented in a CMOS die about 1 $cm^2$ in area. The die is packaged in a square ceramic carrier having input/output pins that include a set of instruction pins, a set of memory pins, a set of cube pins, a set of NEWS pins, a clock input, a global pin and an error pin. Instructions are applied to control unit 337 via the instruction pins so as to control the operation of the processors and router. Under direction of the control unit, the processors of an integrated circuit take data from the memory associated with that integrated circuit, perform arithmetic and logical operations on such data, and store the results in the memory. Advantageously, the memory pins are bidirectional, and all transfers to and from memory take place over the memory pins.

The router is responsible for routing addressed messages between integrated circuits 334 and delivering the messages to the destination specified by the address. The router communicates with the routers of other integrated circuits 334 through the cube pins. Advantageously, the cube pins are also bidirectional in order to reduce the pinout and wiring between adjacent routers in the hypercube. However, since each router can send a message packet to every other router in the hypercube, it is necessary to avoid conflicts in which two nearest neighbor routers at opposite ends of the same line simultaneously attempt to send message packets to each other. Since any two nearest neighbor routers have Hamming distances that differ by one, one such router will have a binary address with an even number of one bits while the other such router will have a binary address with an odd number of one bits. Hence routing conflicts can be avoided by allowing only the routers having an address with an odd number (or an even number) of one bits, to route message packets during a particular message routing cycle.

As indicated above, the processors are also interconnected in a rectangular two-dimensional grid. On each integrated circuit chip 334 the processors are connected in this pattern as a 4×4 array. The two-dimensional pattern is extended across multiple integrated circuit by connecting a processor at an edge of one integrated circuit to a neighboring processor at an adjacent edge of the 4×4 array of an adjacent integrated circuit on the circuit board. In like fashion, processors at the edge of the 4×8 array of integrated circuits on a circuit board 332 are connected to a neighboring processor at an adjacent edge of the 4×8 array of integrated circuits on another circuit board. Connections to adjacent processors in the two-dimensional grid are made through the NEWS pins which advantageously are also multiplexed so as to reduce the pin count.

Figure 5:
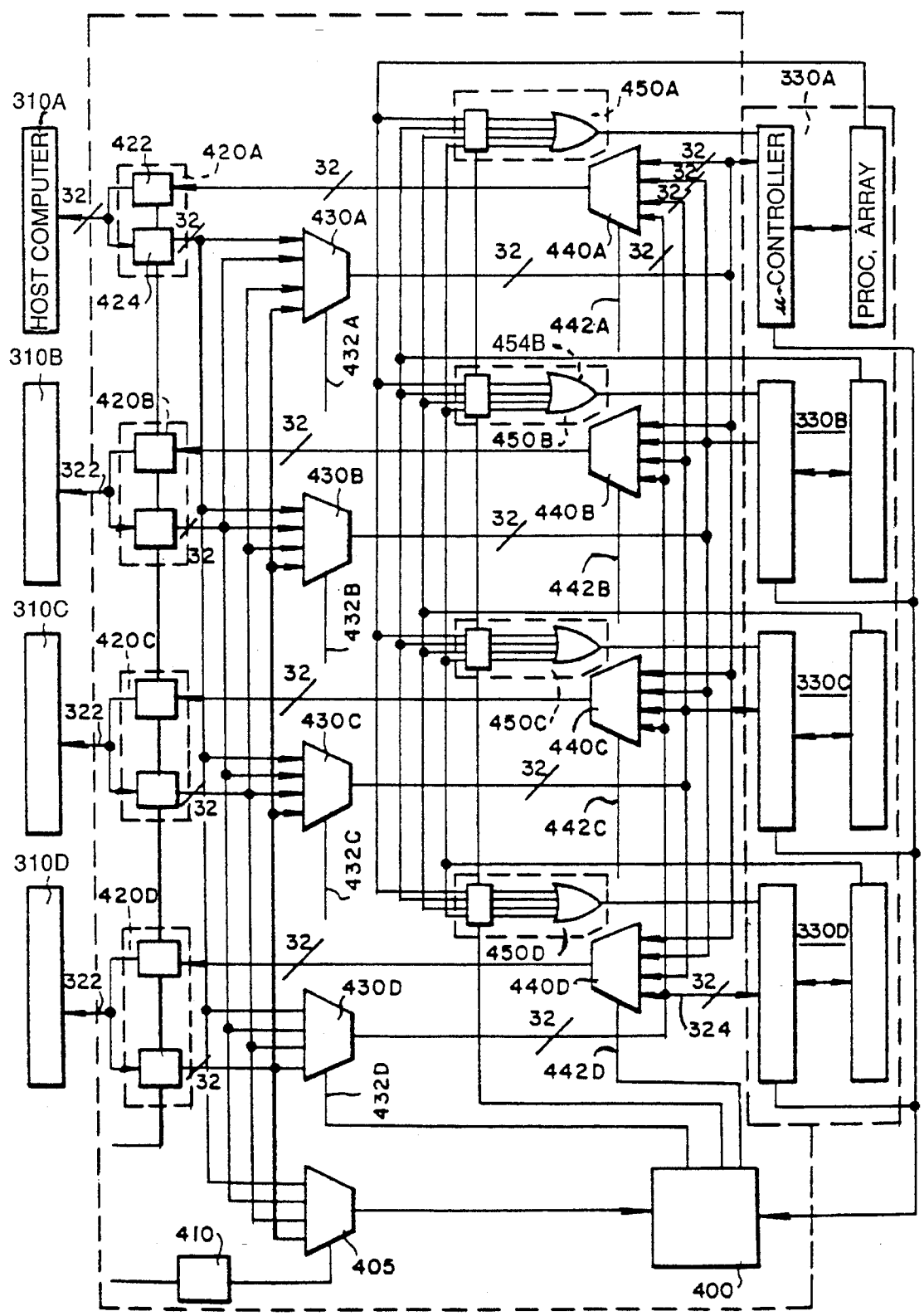
FIG. 5 is a detailed schematic diagram of an element of FIGS. 3 and 4.

Further details of interconnector 320 are set forth in FIG. 5. As shown therein, interconnector 320 comprises a status register 400, a status register multiplexer 405, an encoder 410, four transceivers 420A–D, four write multiplexers 430A-D, four read multiplexers 440A–D, and four global signal arrays 450A–D. Status register 400 controls the operation of write multiplexers 430A–D, read multiplexers 440A–D, and global signal arrays 450A–D so as to connect any one of host computers 310A–D to any one or more of processor arrays 330A–D. Encoder 410 and multiplexer 405 select one of four input lines to multiplexer 405 for connection to an output line from the multiplexer to the status register. Transceivers 420A–D control the direction of signal flow on first busses 322A–D so that signals flow toward the host computers while the processor arrays are being read and from the host computers while data are being written into the processor arrays.

Write and read multiplexers 430A–D, 440A–D are arrays of one-out-of-four multiplexers, each of which multiplexes four input lines onto one output line. Each multiplexer 430A–D, 440A–D comprises thirty-two such one-out-of-four multiplexers so that four sets of thirty-two input lines are multiplexed in parallel by each multiplexer 430A–D, 440A–D onto one set of thirty-two output lines. The selection of the set of input lines that is connected by a multiplexer to its set of output lines is controlled by three input lines 432A–D, 442A–D to each multiplexer from status register 400. Binary signal levels on input lines 432A–D, 442A–D are determined by status signals that are stored in latches in status register 400.

The status signals specify which host computers are connected to which processor arrays. Every possible combination of host computers and processor arrays can be specified by a number of signals equal to the product of the number of host computers and the number of processor arrays. These signals are encoded by a host computer into binary encoded form and are routed via one of data busses 322A–D and multiplexer 405 to status register 400 where they are stored. The encoded signals on the status lines specify which input lines to multiplexers 430A–D, 440A–D are to be connected to the output lines to effect the desired connection pattern. For example, to specify the connections of the four host computers to processor array 330A, four two bit signal states are used, 00, 01, 10, 11, each one representing the connection of one of the host computers to the processor array. For each processor array that is to be connected to a host computer, one of these four values is stored in an appropriate latch in status register 400. In addition, status register 400 also stores a no-operation signal indicating when no connection is to be made between the inputs to a multiplexer and its output.

Global signal arrays 450A–D provide for the selective combination of signals such as global signals that are forwarded from the processors 336 of each array to the different microcontrollers 350A–D. The global signal, for example, is formed as the logical OR of an output signal from each processor in the processor array. It is used to synchronize operation of the processors by combining and using output signals from each processor in such a way that no further operations can be performed until each processor in the array has completed a previous operation. For example, a selected output signal from each processor can change from a high to a low state when the processor completes each operation. These signals are combined in a logical OR circuit so that a global output signal from such circuit does not change state until all the input signals to such circuit from the various processors change state so as to signify completion of the operation. The global output signal, in turn, is used by the microcontroller in such a way that the processors of the array cannot perform any further operation until all of them have signified completion of the previous operation. For example, the microcontroller can use the global output signal to control incrementation of a program counter or the like that controls the issuance of instructions from the microcontroller to the processors.

In the present invention, global signal arrays 450A–D provide for the combination of global signals from different processor arrays so that the operation of a plurality of processor arrays may be synchronized. Each global signal array comprises a line controller 452A–D and an OR gate 454A–D. Each line controller 452A–D, which may be an array of AND gates, has a global signal input from the processors of each processor array and a control signal input 456A–D from status register 400. The control signals specify which global signal inputs are applied to each OR gate 454A–D and are thereby combined to form a global output signal that is applied to one of microcontrollers 350A–D. In accordance with the invention, the control signals provide for the combination of global signals from different processor arrays where such processor arrays are connected to the same host computer 310. As a result, the global output signal is applied to the microcontrollers for each such array so as to synchronize their operation.

For example, if processor arrays 330A and 330B are connected to host computer 310A, multiplexers 430A and 430B provide for the connection of host computer 310A to processor arrays 330A and 330B and multiplexer 440A provides for the connection of arrays 330A and 330B to host computer 310A. Global signal arrays 450A and 450B each provide for the connection of global signals from the processors of array 330A and the processors of array 330B to OR gates 454A and 454B. These signals are applied by the OR gates 454A and 454B to microcontrollers 350A and 350B, respectively, where they are used to synchronize operation of the two processor arrays. In particular, since the same signals are used to control both arrays, the two arrays can be operated in parallel and signals can be interchanged between individual processors in the two arrays. Advantageously, these signals can be interchanged by interconnecting the processors in the topology of a hypercube as disclosed in the '400 patent and extending the hypercube over the processors in both arrays.

As indicated above, the memory for each processor 336 preferably is a 4K×1 bit random access memory on an integrated circuit. Sixteen such memories for sixteen processors are organized together along with 4K×6 bits of parity. The memory is read in parallel one row at a time to produce data outputs on sixteen output lines and parity outputs on six additional output lines. These signals are then applied in parallel to error control circuitry for detection of parity errors and correction of such errors if possible.

Illustrative such apparatus is shown in FIGS. 6, 7, 8 and 9. As shown in FIG. 6, the error control circuitry comprises a syndrome generator 500, a multiplexer 505, a syndrome decoder 510 and exclusive OR gates 520, 530, 540. The sixteen data output lines from a RAM 340 and the sixteen data output lines from the sixteen processors 336 are applied via multiplexer 505 at different times as inputs to syndrome generator 500. The syndrome generator generates six syndrome signals by performing modulo 2 addition on the bit values on selected ones of the data output lines from processors 336 or the data output lines from RAM 340 as shown in Table I where the plus sign indicates modulo 2 addition:

TABLE I

| Syndrome signal | Syndrome input lines whose signals are summed | | | | | | | | | | | | | | | |
| --- | --- | --- | --- | --- | --- | --- | --- | --- | --- | --- | --- | --- | --- | --- | --- | --- |
| 0 | 0 | +1 | +2 |    |    |    |    |    |    | +9 | +10 |     | +12 | +13 |     | +15 |
| 1 |   |    |    | +3 | +4 | +5 |    |    | +8 |    | +10 | +11 |     | +13 | +14 |     |
| 2 |   |    |    |    |    |    | +6 | +7 | +8 | +9 |     | +11 | +12 |     | +14 | +15 |
| 3 |   | +1 | +2 |    | +4 | +5 |    | +7 | +8 | +9 | +10 |     |     |     |     |     |
| 4 | 0 |    | +2 | +3 |    | +5 | +6 |    |    |    |     | +11 | +12 | +13 |     |     |
| 5 | 0 | +1 |    | +3 | +4 |    | +6 | +7 |    |    |     |     |     |     | +14 | +15 |

In addition, the syndrome generator also generates an even parity output signal by performing modulo 2 addition on the bit values on all of the data output lines from processors 336 or from RAM 340.

Specific circuitry for implementing the syndrome generator is disclosed in FIG. 7 and comprises arrays of exclusive OR gates 502 connected as shown to syndrome input lines 0–15 to produce syndrome output signals 0–5 in accordance with Table I as well as a parity output signal.

In the case where the data applied to syndrome generator 500 is parallel data being written from the sixteen processors 336 to sixteen memories, the six syndrome outputs are written into six memories at the same addresses and at the same time as the data bits used in generating the syndrome outputs are stored in the sixteen memories.

In the case where the data applied to syndrome generator 500 is data being read in parallel from the sixteen memories, the six syndrome outputs generated by syndrome generator 500 from this data are compared in parallel by six exclusive OR gates 520 with the six syndrome signals that were stored at the same address as the sixteen data bits. The results of these comparisons are provided to syndrome decoder 510. Syndrome decoder determines if there are any discrepancies between the outputs from the syndrome generator and the syndrome signals read from the memories and decides whether an error can be corrected. If there are no discrepancies, the output of each of the six exclusive OR gates 520 will be a low signal. In this case, the output of the syndrome decoder on each of the sixteen lines to the sixteen exclusive OR gates 530 will be low and the output on the line to exclusive OR gate 540 will be high. As a result, the signals on the sixteen data output lines that are applied to exclusive OR gates 530 will not be changed and these signals will be provided to the sixteen processors 336. Likewise, the even parity output signal from syndrome generator 500 will not be changed.

If, however, there is a discrepancy between the six syndrome signals and the six parity values, there is an error in the signals from the RAM; and the syndrome decoder will attempt to correct for this. In particular, it will generate a correction signal for each of the sixteen data output lines by forming the logical AND of different sets of three of the six outputs of exclusive OR gates 520. It will also determine if the error can be corrected since only some errors can be corrected with the limited number of syndrome bits that are used.

Specific apparatus for the syndrome decoder 510 is shown in FIGS. 8 and 9. The inputs to these circuits are the six output signals SYN0–SYN5 from exclusive OR gates 520. As shown in FIG. 8, the correction generation circuitry comprises a first array of six NAND gates 512 connected as indicated and a second array of sixteen AND gates 513 with inverting inputs likewise connected as indicated to produce correction signals COR0–COR15. As will be apparent, the connection pattern between inputs and outputs of the circuitry of FIG. 8 is also specified by Table I in that the entries in each of the sixteen columns of Table I specify the three signals from exclusive OR gates 520 that are used to generate an output correction signal.

As shown in FIG. 9, the circuitry for determining if an error can be corrected comprises an OR gate 514, an array of five exclusive OR gates 515, and two NAND gates 516, 517. OR gate 514 detects if there is any discrepancy between the six syndrome signals from syndrome generator 500 and the six syndrome signals from RAM. Its inputs are the six signals SYN0–SYN6 from exclusive OR gates 510. Its output is supplied to NAND gates 516, 517 with the output of NAND gate 516 being applied to exclusive OR gate 540 as indicated above. The array of five exclusive OR gates determines if the number of discrepancies is correctable or not. If it is not correctable, the output of NAND gate 517 is low.

As will be apparent to those skilled in the art, numerous modifications may be made in the above-described invention.

What is claimed is:

1. A parallel computer comprising:
   A. a plurality of processing elements each for processing data in response to commands, each processing element generating a global signal in response to selected conditions during processing, said processing elements further generating messages for transmission to other processing elements in response to selected commands, each message including an address of a destination processing element to receive the message;
   B. an interconnection network for receiving messages from the processing elements and for transferring them to destination processing elements in response to their respective addresses;
   C. plurality of host computers each for generating commands for controlling the processing of data and the generation of messages by the processing elements; and
   D. an interconnector including:
      i. a command distribution portion connected to said hosts and said processing elements, said command distribution portion being controlled to selectively establish one or more processing element partitions each comprising a selected disjoint plurality of said processing elements and to further selectively assign a said host computer to a processing element partition, said command distribution portion enabling commands from the host computer assigned to the processing element partition to control the processing elements of the processing element partition while the processing element partition is established; and ii. a global signal combiner portion for generating, for each processing element partition, a combined global signal representative of the global signals from the processing elements comprising the processing element partition and enabling the combined global signal to be provided to control processing by the processing elements.

2. A parallel computer as defined in claim 1 further comprising a plurality of controllers each connected to a processing element array comprising predetermined ones of said processing elements, said interconnector establishing selected ones of said processing element arrays as each processing element partition and, for each processing element partition, transmitting commands from the host computer assigned to the processing element partition to the ones of the controllers that are connected to the processing elements of the processing element groups comprising the processing element partition, each controller generating sequences of control signals for controlling processing by the processing elements in response to the commands.

3. A parallel computer as defined in claim 2 in which said global signal combiner portion includes a plurality of array global signal combiner elements each associated with one of said controllers, each array global signal combines element generating a partition combined global signal in response to global signals from the processing elements comprising the arrays of processing elements of the processing element partition, each controller using the partition combined global signal in generating the sequences of control signals for controlling processing by the processing elements connected thereto.

4. A parallel computer as defined in claim 3 in which each controller further generates array global information related to status of processing by the processing element array connected thereto during processing of a command, said interconnector including a partition global information generator for generating partition global information in response to array global information from controllers of processing elements assigned to a processing element partition, and for transmitting the partition global information to the host computer that is generating commands for that processing element partition, the host computer using the partition global information in connection with subsequent generation of commands.

5. A parallel computer as defined in claim 1 further comprising an interconnector control circuit for controlling the interconnector to establish each said processing element partition in response to status signals from said host computers.

6. A parallel computer as defined in claim 2 further comprising an interconnector control circuit for controlling the interconnector to establish each said processing element partition in response to status signals from said host computers.

7. A parallel computer as defined in claim 6 in which said interconnector comprises:

A. a plurality of command selective transfer circuits, each associated with one of said controllers, for selectively transmitting commands from one of said host computers to the associated controller, the one of said host computers being selected for each command selection circuit in response to a host computer selection signal;

B. a plurality of array global information combiner circuits, each associated with one of said host computers, for generating, for each host computer, partition combined global information in response to global information generated by the controllers of processing element arrays of a processing element partition assigned to the associated host computer, the ones of the controllers being selected for each array global information combiner circuit in response to a controller selection signal;

C. a plurality of partition global signal combiner circuits, each associated with one of said controllers, for generating for each controller a combined partition global signal in response to global signals from the processing elements of the processing element arrays assigned to the processing element partition which includes processing elements connected to the associated controller, the ones of the processing element arrays being selected in response to a processing element array selection signal; and D. said interconnector control circuit generating the host computer selection signal, the controller selection signal and the processing element array selection signal to enable the respective command selection circuits, array global information combiner circuits, and partition global signal combiner circuits to operate.

* * * * *